US009183021B2

(12) United States Patent
Dinn

(10) Patent No.: US 9,183,021 B2
(45) Date of Patent: Nov. 10, 2015

(54) RUNTIME OPTIMIZATION OF APPLICATION BYTECODE VIA CALL TRANSFORMATIONS

(75) Inventor: Andrew E. Dinn, Newcastle Upon Tyne (GB)

(73) Assignee: Red Hat, Inc., Raleigh, NC (US)

( * ) Notice: Subject to any disclaimer, the term of this patent is extended or adjusted under 35 U.S.C. 154(b) by 997 days.

(21) Appl. No.: 13/149,128

(22) Filed: May 31, 2011

(65) Prior Publication Data
US 2012/0311552 A1 Dec. 6, 2012

(51) Int. Cl.
G06F 9/455 (2006.01)
(52) U.S. Cl.
CPC .................... G06F 9/45525 (2013.01)
(58) Field of Classification Search
None
See application file for complete search history.

(56) References Cited

U.S. PATENT DOCUMENTS

| 5,966,539 | A * | 10/1999 | Srivastava | 717/156 |
|---|---|---|---|---|
| 6,385,764 | B1 * | 5/2002 | Blandy et al. | 717/127 |
| 6,865,730 | B1 * | 3/2005 | Burke et al. | 717/116 |
| 2002/0174418 | A1 * | 11/2002 | Ruf | 717/155 |
| 2003/0093780 | A1 * | 5/2003 | Freudenberger et al. | 717/153 |
| 2003/0225917 | A1 * | 12/2003 | Partamian et al. | 709/310 |
| 2004/0205739 | A1 * | 10/2004 | Haber et al. | 717/151 |
| 2005/0149912 | A1 * | 7/2005 | Farcy et al. | 717/124 |
| 2006/0158354 | A1 * | 7/2006 | Aberg et al. | 341/50 |
| 2009/0055813 | A1 * | 2/2009 | Haber et al. | 717/158 |
| 2009/0254893 | A1 * | 10/2009 | Ahuja et al. | 717/152 |

OTHER PUBLICATIONS

Butts et al. "Dynamic Dead-Instruction Detection and Elimination", 2002, Proceedings of the 10th international conference on Architectural support for programming languages and operating systems, pp. 199-210.*
Martin et al. "Exploiting Dead Value Information", 1997, Proceedings., Thirtieth Annual IEEE/ACM International Symposium on Microarchitecture, pp. 125-135.*
Hirzel et al. "On the Usefulness of Type and Liveness Accuracy for Garbage Collection and Leak Detection", 2002, ACM Transactions on Programming Languages and Systems (TOPLAS), vol. 24, Issue 6, pp. 593-624.*

* cited by examiner

Primary Examiner — Jue Louie
(74) Attorney, Agent, or Firm — Lowenstein Sandler LLP

(57) ABSTRACT

A method and system for optimizing application code via transformation of calls made by the application code during runtime. A computer system loads the application code that has been intermediately compiled into bytecode. The computer system then compiles and executes the application code. During runtime, the application code makes a call from a call site to an implementation of an operation that returns a value to the application code. The computer system runs an implementer of the implementation and an agent that operates independently of a compiler. The agent receives a notification of the call, performs an analysis on the application code during runtime to determine whether the value is used by the application code, and optimizes the application code by transforming the call site based on a result of the analysis.

19 Claims, 5 Drawing Sheets

RUNTIME OPTIMIZATION OF APPLICATION BYTECODE VIA CALL TRANSFORMATIONS

TECHNICAL FIELD

Embodiments of the present invention relate to runtime optimization of bytecode, and more specifically, to runtime optimization of bytecode via transformation of calls that are made to an implementation of an operation.

BACKGROUND

One of the commonly-used data structure in Java language is "map," which is a data store that organizes data as (key, value) pairs. The key in a (key, value) pair uniquely identifies the corresponding value. An application programming interface (API) to the map supports operations which allow values to be added to (via a put operation), retrieved from (via a get operation), or removed from (via a remove operation) the map. In all of these three cases, a key is presented to the API to identify the corresponding value being added, retrieved or removed.

In some scenarios, the data store can be very large and can be partitioned and/or replicated across many host machines. Thus, any changes to the (key, value) pairs need to be propagated from machine to machine. As an example, Red Hat® Infinispan implements a high-performance cache organized as a map. When an Infinispan client requests a put operation to be performed on a cache value identified by a key, the put operation can potentially replace an existing cache value (i.e., a previous value). Thus, the client can be presented with a choice between a first put operation that returns a previous value (or some clearly identified null value if no entry was present previously), or a second put operation that does not return a previous value. A client that requires a return value may need to wait while the update is propagated to other host machines in order to be sure the correct previous value is returned. By contrast, a client that does not need the return value can proceed without waiting and, therefore, can speed up its operations.

In other scenarios, a client is presented with an API that only implements a put operation that returns a previous value, regardless of whether or not the client needs the previous value. For example, there are two standard APIs defined by the Java language runtime interfaces "Map" and "ConcurrentMap," both of which support the set of operations: get, put and remove, but the put operation has only the implementation that returns the previous value. This means that a client needs to wait for the result to be computed and returned, even if it ignores the returned result. This unnecessary wait time can significantly slow down the operations of the application code.

The problem of unnecessary wait time may be resolved, in some cases, by re-writing the client application so it is parameterized to accept only an Infinispan cache. In cases where the return value is needed, the client can invoke the put operation that returns a result. In cases where the return value is ignored, the other put operation can be invoked. However, there are legitimate cases where code needs to be able to operate on any map, not just an Infinispan cache. There may also be other reasons why it is not possible to redefine client code, e.g., the client code is proprietary, the client code forms part of the Java runtime, or the client code is frozen due to logistical, commercial or other hurdles.

BRIEF DESCRIPTION OF THE DRAWINGS

The present invention is illustrated by way of example, and not by way of limitation, and can be more fully understood with reference to the following detailed description when considered in connection with the figures in which.

DETAILED DESCRIPTION

Figure 1:
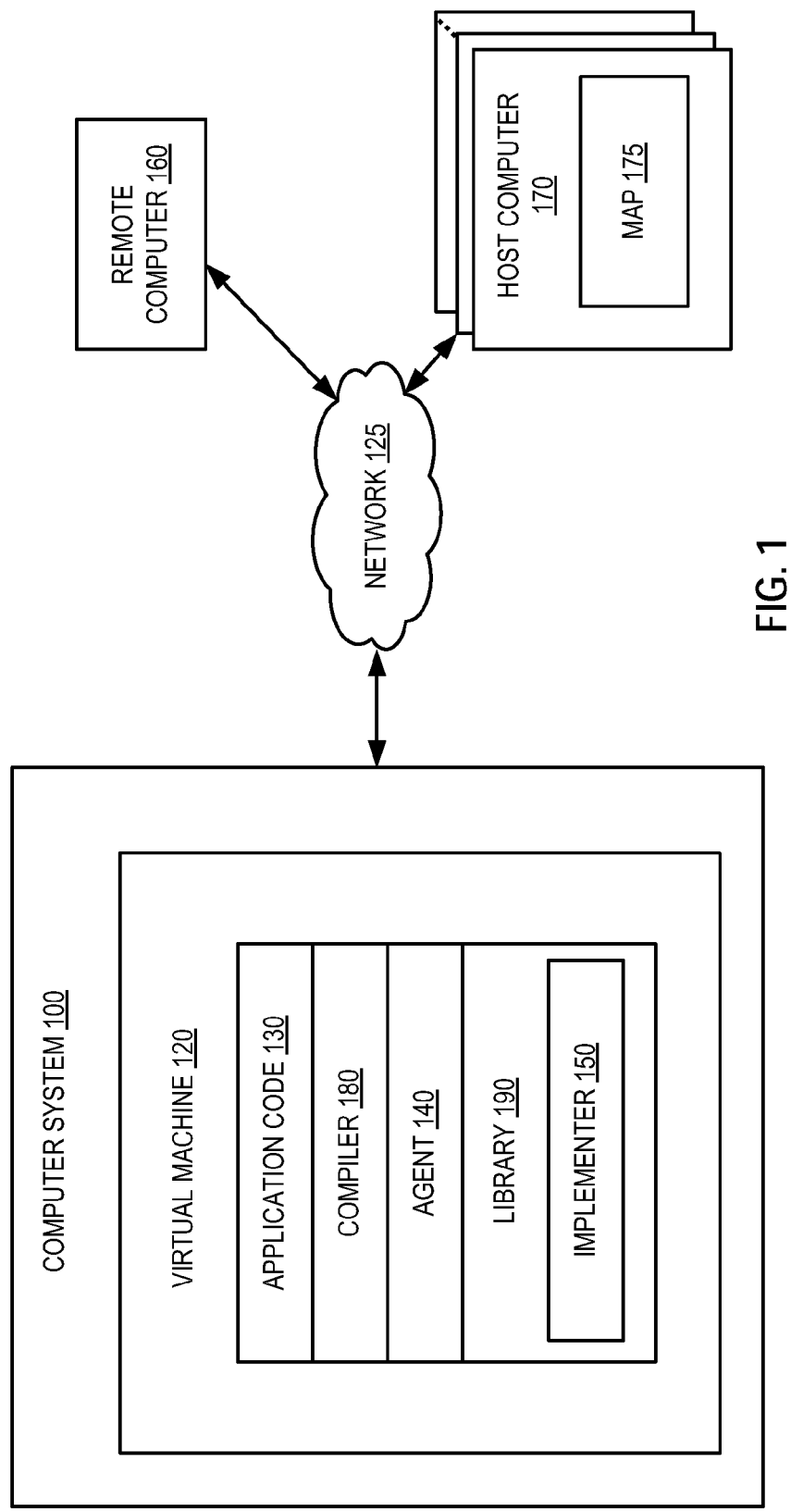
FIG. 1 is a block diagram illustrating an embodiment of a computer system that optimizes application code during runtime.

Described herein is a method and system for optimizing application code via transformation of calls made to a slow implementation of an operation during runtime. In one embodiment, a computer system loads the application code that has been intermediately compiled into bytecode. After the computer system compiles the application code with a compiler, it executes the compiled application code. During runtime, the application code makes a call to an implementation of an operation that returns a value to the application code. The computer system runs an implementer of the implementation and an agent that operates independently of the compiler. The agent receives a notification of the call from the implementer, performs an analysis on the application code during runtime to determine whether the value is used by the application code, and optimizes the application code by transforming the call site based on a result of the analysis.

Embodiments of the invention have a wide range of applicability. In addition to the scenario of a put operation performed on a map, embodiments of the invention can be applied to application code invoking an operation (e.g., put or other operations) that returns a result, where the operation can have two alternative concrete implementations in a library, a slow implementation that returns a value and a fast implementation that does not. The application code that makes a request to perform the operation provides no hint to the called routine as to whether it really needs to use the return value. Embodiments of the invention optimize the application code by monitoring calls to the original slow implementation, analyzing the application code that has invoked the original slow implementation, and identifying whether or not the application code uses (e.g., consumes or stores) the return value. If the application code does not use the return value and it is legitimate to transform the call site, the application code is transformed such that further calls from the call site will be made to the fast implementation in place of calls to the original slow implementation. In one embodiment, the transformation from the original slow implementation to the fast implementation is referred to as a primary transformation.

In some embodiments, the primary transformation can be supplemented with a secondary transformation to further optimize the performance of the application code. The secondary transformation is applied to the cases where the return value is used, or where it is not possible to determine whether it is legitimate to invoke the fast implementation. The secondary transformation transforms a call site from calling the original slow implementation into calling an alternative slow implementation, which returns the same value as the original slow implementation but avoids performing any monitoring operation. This serves to avoid unnecessary, repeated analysis of the application code at the same call site.

Embodiments of the invention modify the application code with the primary and secondary transformations while the application code is running. In one embodiment, the application code is an intermediate compiled version (e.g., bytecode) of original application source code. In one embodiment, the bytecode transformation is enabled by an agent that runs on a virtual machine (e.g., the Java Virtual Machine (JVM)). The transformation introduces a linkage dependency between the transformed code and the implementation code such that calls to the fast and the alternative slow implementations can be performed. Embodiments of the invention resolve this dependency using the agent's capability.

Although certain embodiments described herein reference JAVA and the Java Virtual Machine, it should be understood that other embodiments may use other programming languages, other compilers, and/or other runtime environments (e.g., C++, C#, .NET, etc.). In one embodiment, the JVM may permit loaded bytecode to be inspected and transformed (e.g., modified). The JVM may also permit the transformed bytecode to be submitted (e.g., sent and/or communicated to) a Just-InTime (JIT) compiler so that the transformed bytecode could be compiled using the JIT compiler. It should be understood that various JVMs permit bytecode to be transformed and submitted to a JIT compilers. It should also be understood that in other embodiments, other types of virtual machines may be used and these other types of virtual machines may also allow bytecode to be transformed and submitted to a compiler.

In the following description, numerous details are set forth. It will be apparent, however, to one skilled in the art, that the present invention may be practiced without these specific details. In some instances, well-known structures and devices are shown in block diagram form, rather than in detail, in order to avoid obscuring the present invention.

FIG. 1 is a block diagram that illustrates an embodiment of a computer system 100 that performs optimization of application code. The computer system 100 can be one or more mainframes, workstations, personal computers (PCs), or other computing devices. In one embodiment, the computer system 100 hosts a virtual machine 120, such as a Java Virtual Machine (JVM) or a virtual machine implemented in a different programming language (e.g., Javascript). The virtual machine 120, which is also referred to as a process virtual machine or an application virtual machine, provides a high-level abstraction (i.e., at the level of a high-level programming language) that allows an application to execute in the same way on any hardware platform and any operating system environment.

In one embodiment, the computer system 100 is coupled to a remote computer 160 over a network 125. The computer system 100 can download application code 130, in the form of intermediately compiled bytecode, from the remote computer 160 (e.g., a Web server). The computer system 100 is also coupled to one or more host computers 170 via the network 125. In one embodiment, the host computers 170 provide a data store ("map 175") that stores a collection of (key, value) pairs. Each host computer 170 can store a portion of and/or a replica of the map 170. The network 125 can be a private network (e.g., a local area network (LAN), a WAN, intranet, or other similar private networks), a public network (e.g., the Internet), or a combination of the above networks. In an alternative embodiment, the map 175 can be stored in a centralized location remotely from or locally at the computer system 100. In yet another alternative embodiment, the computer system 100 is not coupled to the remote computer 160 and/or the host computers 170, and can receive the application code 130 and/or retrieve stored data values from other sources (e.g., local sources).

In one embodiment, the application code 130 is loaded into the virtual machine 120 and compiled from bytecode into machine code. The virtual machine 120 can compile the bytecode using a Just-in-Time (JIT) compiler 180 (e.g., a compiler which compiles application code into machine code, as the application code is needed and/or used), and executes the machine code on the computer system 100.

In some scenarios, the application code 130 includes instructions that request an operation (e.g., a put operation) to be performed. In one embodiment, the virtual machine 120 includes an agent 140 that analyzes the application code 130 at runtime and transforms the application code 130, also at runtime, to reduce or eliminate the wait for a return value when the return value is not used. The virtual machine 120 also includes a library 190, which can be an application library provided by a third party (which is different from the provider of the application code 130). Thus, the library 190 receives no hints and has no knowledge of the calls that the application code 130 made during runtime (i.e., during execution time of the application code 130). In one embodiment, the library 190 includes an implementer 150, which implements and performs the transformed operations.

Figure 2:
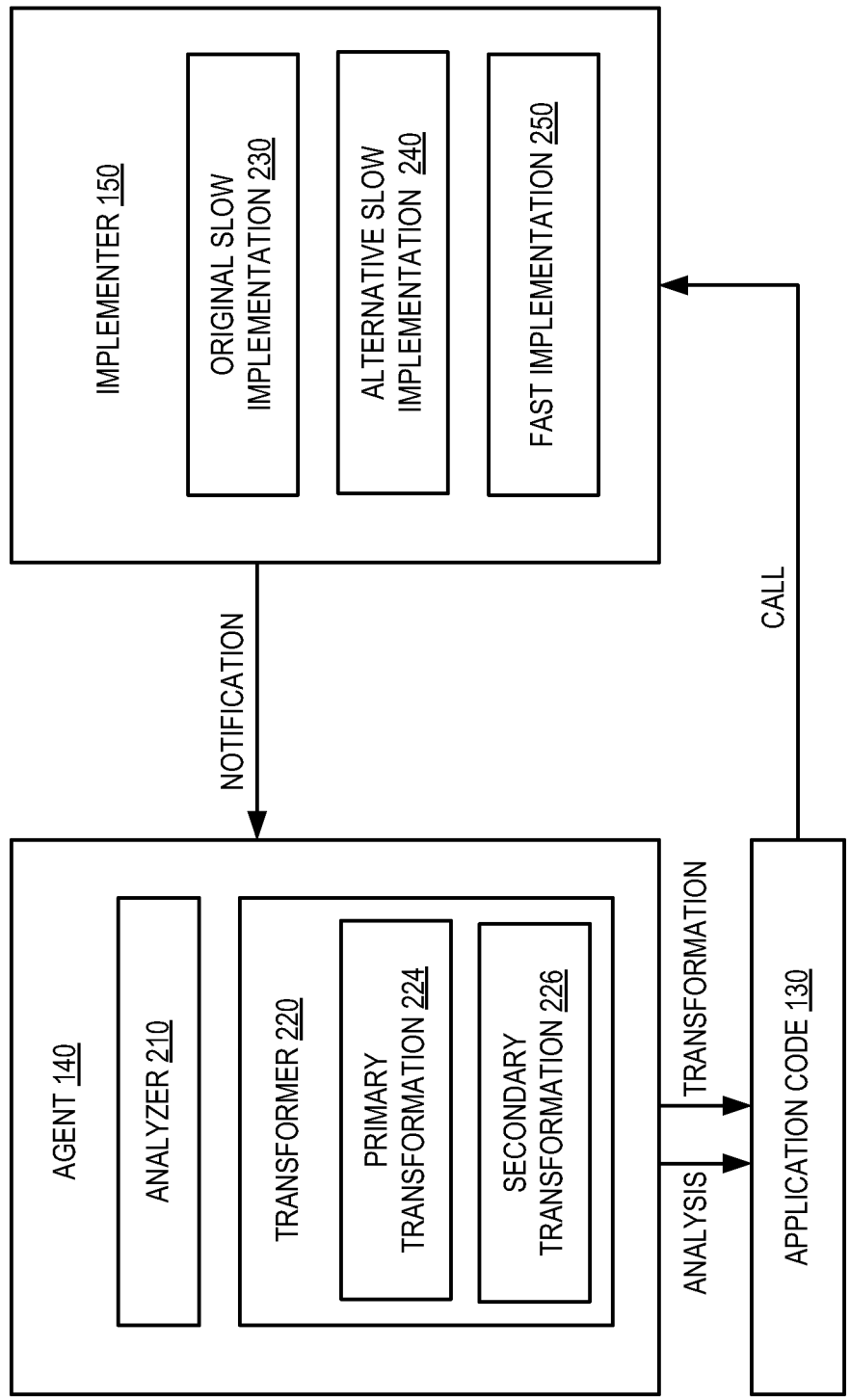
FIG. 2 is a diagram illustrating one embodiment of an agent and an implementer on the computer system of FIG. 1.

FIG. 2 is a block diagram illustrating an embodiment of the agent 140 and the implementer 150, as well as their interactions with the application code 130. In one embodiment, the implementer 150 provides: (1) an original slow implementation 230, which notifies the agent 140 of a call from a client application (e.g., the application code 130), and then performs the operation that returns a value; (2) an alternative slow implementation 240, which performs the operation and returns a value without notifying the agent 140 of the call; and (3) a fast implementation 250, which performs the operation and returns no value. In one embodiment, the original slow implementation 230, the alternative slow implementation 240 and the fast implementation 250 are different implementations of a put operation on the map 170. In alternative embodiments, the original slow implementation 230, the alternative slow implementation 240 and the fast implementation 250 can be different implementations for any operation.

In one embodiment, the implementer 150 implements the original slow implementation 230 (e.g., a Java method) and the associated API (e.g., a Java interface) that defines the original slow implementation 230. The implementer 150 can also implement abstract operations (e.g., abstract Java methods) and one or more abstract APIs defining these abstract operations, where the abstract operations and the abstract APIs can resolve to the original slow implementation 230 (e.g., a concrete and non-abstract Java method) at linkage time (i.e., when the compiled application code 130 is linked to the specific resources in the library 190). Thus, when the application code 130 calls the abstract APIs and associated abstract operations at runtime, it is the original slow implementation 230 that is called. All of these operations have the same signature (e.g., parameter types and return type). Additionally, the implementer 150 implements the alternative slow implementation 240 and the fast implementation 250, as well as an alternative API (e.g., a Java interface) that defines two associated alternative operations. The alternative API and its associated alternative operations can be resolved to the implementations 240 and 250 at linkage time. The fast implementation 250 has the same parameter types as the original slow implementation 230 and a void return type. The alternative slow implementation 240 has the same signature as the original slow implementation 230.

With the fast implementation 250, the implementer 150 can take whatever short cuts appropriate to allow it to operate correctly as an implementation of the abstract API while profiting from the fact that it does not have to return a result. The original and alternative slow implementation 230, 240 are identical, except for one small difference with respect to agent notification. Both implementations 230, 240 implement the abstract operation so that they operate correctly as an implementation of the abstract API returning a result. However, the original slow implementation 230 notifies the agent 140 that the original slow implementation 230 has been called, while the alternative slow implementation 240 sends no notification.

In one embodiment, when the agent 140 is notified for the first time during runtime of the application code 130, the notification to the agent 140 can involve installing the agent 140 onto the runtime virtual machine 120. In an alternative embodiment, the agent 140 can be pre-installed onto the virtual machine 120 when the virtual machine 120 is started. In one embodiment, the first agent notification for a given operation can also involve registering with the agent 140 the linkage information regarding implementations 230, 240 and 250. In an alternative embodiment, the implementer 150 can pre-register this linkage information with the agent 140. In one embodiment, the linkage information includes details for linking an abstract API (as well as its associated abstract operation) to the original slow implementation 230, and details for linking an alternative API (as well as its associated alternative operations) to the alternative slow implementation 240 and the fast implementation 250.

In one embodiment, the notification to the agent 140 initiates analysis and transformation of the call site in the application code 130. The "call site" refers to a CALL instruction in the application code 130 that invokes the original slow implementation 230. Upon notification, the agent 140 captures runtime information in the notification, which identifies the method from which the call to the original slow implementation 230 was made. The agent 140 then identifies the class that defines the method and schedules a selected scope (e.g., the call site, other calls within the identified method, all methods in the identified class) of the application code 130 for transformation. In some scenarios, the agent 140 may receive other notifications in parallel with this transformation process. In one embodiment, the agent 140 keeps track of the call sites that call the original slow implementation 230, and detects and ignores any repeated notifications which occur while the transformation is being performed.

In one embodiment, the agent 140 includes an analyzer 210 that performs analysis on the application code 130, and a transformer 220 that transforms the application code 130 when appropriate (as described below). The analysis performed by the agent 140 is relatively simple. Upon notification from the implementer 150, the agent 140 searches the code (e.g., in the form of bytecode) of any class identified from the notification for calls that invoked operations in the original linkage set (which includes direct calls to the original slow implementation 230 as well as calls to the abstract APIs and associated abstract operations). Whenever the agent 140 finds such a call, it checks the bytecode following the call site to detect whether the value returned from the call is used. In one embodiment, the agent 140 does not need to identify every case where the value is unused. Rather, the agent 140 identifies that the value is not used by noting that the next instruction (to the call site) in the bytecode is a pop (e.g., Java bytecode POP) or return (e.g., Java bytecode RET). The agent 140 applies a primary transformation 224 (which transforms a call site into calling the fast implementation 250) if it is decided that the value is not used. The agent 140 applies a secondary transformation 226 (which transforms a call site into calling the alternative slow implementation 240) in other cases (when the value is used, when it cannot be determined whether the value is used, and when it cannot be determined whether the call site can be transformed into the fast implementation 250). In an alternative embodiment, the agent 140 can perform a full check on the application code 130 by analyzing all operations subsequent to the call site. The analysis can include determining whether the application code 130 consumes the value, stores the value for later retrieval (e.g., in a local storage location, a global storage location, or in an object field), or uses the value in any manner and for any purpose. However, this alternative embodiment is much more time-consuming than the embodiment in which only the next instruction to the call site is checked.

As described above, a call site is a specific location where a CALL instruction in the application code 130 invokes the original slow implementation 230. In one embodiment, there can be more than one CALL instruction in the application code 130 that can invoke the original slow implementation 230, because the application code 130 may need to read or update a map or a cache at many different points during execution. In one embodiment, the agent 140 can select a scope of transformation on the call site or call sites out of necessity or based on policy considerations. For example, the agent can apply the transformation to the method that includes the CALL instruction (as well as other CALL instructions), or the class defining the method (as well as other methods). If there is enough information available in the notification, the agent 140 can restrict the transformation to a specific subset of the calls within the method, or a single call that actually invokes the original slow implementation 230.

As a preliminary matter, it is noted that the application code 130 is organized as a set of independent methods, each of which belongs to a specific class. So, any given call site that will occur belongs to a unique class/method. However, this does not guarantee a bi-directional uniqueness. Any given method may contain more than one call site. This is the reason why it may be necessary to update multiple call sites during transformation.

In one embodiment, the instrumentation code in the original slow implementation 230 is guaranteed to be able to identify which application class and method included the call site, but it cannot be guaranteed to identify the exact location of the CALL instruction inside that method. In some cases there may only be one call site so it is clear the call was made from that site. In other cases the method may include information which allows the location of the call site to be identified or, at least, restricted to some of the possible locations. But in most cases the agent 140 can only know that the original slow implementation 230 was called from one of the possible call sites in a specific application class/method, but it cannot know which one.

In one embodiment, when the agent 140 performs the transformation it may locate the class/method and limit any changes it makes to code belonging to that method. If the agent 140 cannot determine which CALL instruction actually invokes the original slow implementation 230, it needs to transform every possible call site within the method. The agent 140 finds each CALL instruction within the method, determines whether the target of the call could be the original slow implementation 230 and, if so, transforms that call site and so on to the next one.

There is also a policy decision which can be made during transformation. An application class which is known to contain a call site in one of its methods may well contain call sites in other methods. The agent 140 can decide to "eagerly" transform code belonging to other methods of the class. Adopting this policy can be beneficial because it can do all the transformation work in one go with the minimum of effort. However, in some scenarios, transforming the calls within the whole class can be a waste of time, e.g., because it turns out that there are no other call sites, or because the other possible call sites do not actually get visited during execution so the extra transformation work is wasted effort. This "eager" transformation is an extrapolation from the fact that a call to the original slow implementation 230 has occurred to the assumption that other calls within the same class might end up invoking the same implementation 230. That is why this "eager" transformation is an extra policy option rather than a necessary step.

In one embodiment, the agent 140 can adopt different strategies for selecting the scope of the application code 130 to be transformed, so long as it ensures that it keeps track of duplicate notifications at a comparable level of granularity (e.g., a class, the method, a single call within the method, or a subset of calls within the method). Duplicated notifications are tracked such that the same scope of the application code 130 is not analyzed more than once.

In one embodiment, the primary transformation 224 performed by the agent 140 replaces a call to the abstract implementation (i.e., abstract APIs and associated abstract operations) or a direct call to the original slow implementation 230 with a call to the fast implementation 250. In some embodiments, the primary transformation 224 can additionally patch up the stack to account for the lack of a return value with the fast implementation 250. In the case where the next instruction (to the call site) is a pop, this instruction (pop) can be removed. In the case where the next instruction is a return instruction, no patching is necessary since the stack values are discarded at return. Other cases based on deeper analysis can be dealt with by stacking a null (or zero) value. Since the value is not used, it actually does not matter what value is employed in the stack.

In some scenarios, the primary transformation 230 described above cannot be performed. It is only appropriate to call the fast implementation 250 when the target of the abstract operation is an instance of a class which implements the alternative API. This is true if the call site employs a direct call to the original slow implementation 230, but is not necessarily true if the call is via one of the abstract APIs.

In one embodiment, if the call is via one of the abstract APIs, then a slightly more complex transformation is necessary. The original call (and the next instruction if it is a pop) is replaced by an instruction sequence starting with a runtime type test (e.g., Java instruction INSTANCEOF) to determine whether the target instance implements the alternative API followed by a branch instruction. The true branch includes a type cast (e.g., Java instruction CHECKCAST) followed by a call to the fast implementation 250 (plus a null or zero stack if the original call was not followed by a pop). The false branch includes the original call (plus a pop if the original code included one). Both branches then continue at the instruction following the original call (or after the pop if the call was followed by a pop).

In one embodiment, the agent 140 performs the secondary transformation 226 by replacing the call to the abstract implementation (or a direct call to the original slow implementation 230) with a call to the alternative slow implementation 240. However, since the replacement call returns a result in the same way as the original slow implementation 230, there is no need to patch up the stack.

Similar to the first transformation, the secondary transformation 226 may not be performed in some scenarios. It is only appropriate to call the alternative slow implementation 240 when the target of the abstract operation is an instance of a class which implements the alternative API. This is true if the call site employs a direct call to the original slow implementation 230, but is not necessarily true if the call is via one of the abstract APIs.

If the call is via one of the abstract APIs, then a slightly more complex transformation (similar to the primary transformation 224 described above) is necessary. The original call is replaced by an instruction sequence starting with a runtime type test (e.g., Java instruction INSTANCEOF) to determine whether the target instance implements the alternative API followed by a branch instruction. The true branch includes a type cast (e.g., Java instruction CHECKCAST) followed by a call to the alternative slow implementation 240. The false branch simply includes the original call. Both branches then continue at the instruction following the original call.

The combination of the primary transformation 224 and secondary transformation 226 is "self-healing," that is, it ensures that the original slow implementation 230 eventually stops being called from the same call site, in favor of either the fast implementation 250 or the alternative slow implementation 240. This means that once the initial cost of performing the transformation (224 or 226) has been met, there is no additional overhead involved in detecting and ignoring repeat notifications. Omitting the secondary transformation 226 is also an option, but it means that calls that cannot be transformed to employ the fast implementation 250 keep incurring the overhead of notifying a previously identified call site.

Resolving Linkage Issues: The original application code 130 prior to transformation is able to invoke the implementer's 150 original slow implementation 230 without the need for the implementer class to be in its classloader scope (class B is in the classloader scope of class A when references to class B by name in the code of class A are correctly resolved during linking). The transformed application code 130 includes references to the alternative API (e.g., a Java interface) which means this alternative API needs to be visible in the classloader scope of the transformed application code 130.

This requirement can be satisfied by ensuring that the API class is loaded via the bootstrap classloader. Classes which are loaded in this way are in scope for every class in the virtual machine 120 (e.g., a JVM), including the classes which implement the JVM itself. Alternatively, the code can be made available via the system loader, which ensures that the application code 130 (but not the JVM runtime code) will be able to resolve the registered API. The capability of the agent 140 enables both these options to be performed when the implementer 150 registers its API. It is also noted that the implementer 150 itself needs to reference the API. However, the loading of the implementation code can be organized such that this requirement is satisfied.

Embodiments of the invention have many advantages. The optimization (including analysis and transformation) is dynamic and adaptive. That is, the optimization is performed at runtime in response to calls to the original slow implementation 230, so optimization occurs in response to invocation of a registered implementation.

The optimization is autonomous. The optimization opportunity is detected and notified by the implementer 150 at runtime which operates independently of the compiler 180 of FIG. 1.

The optimization is third party. The optimization is negotiated by the implementer 150, but applied to the independent application code 130 which has been built without any compile or link time dependency on the implementer 150. The implementer 150 is part of the library 190 that operates independently of the application code 130. The library 190 can be provided by a third party which is independent of the provider of the application code 130. The provider of the library 190 may have no knowledge of the details of the application code 130, and, thus, the library 190 receives no hints of the calls that will be made by the application code 130 during runtime. Nevertheless, the library 190 can, with the use of the agent 140, optimize the execution of the application code 130.

The optimization occurs in the "user space" (as opposed to the "system space" performed by the compiler 180). The optimization is performed at runtime on intermediate compiled application code 130 (e.g., bytecode), so it is not an offline source-to-source transformation. Yet the optimization is performed by the agent 140, which in one example is a loadable Java program. The optimization can be performed on the bytecode at any time during runtime. After the bytecode is transformed, the transformed bytecode can be re-compiled, also at runtime, by the built-in JIT compiler 180 provided by the virtual machine 120.

The optimization is extensible. Multiple implementations (e.g., the original slow, alternative slow and fast implementations 230, 240, 250 and other implementations) can register with the agent 140. The optimization of calls to these implementations and their APIs can be performed repeatedly as necessary.

Figure 3:
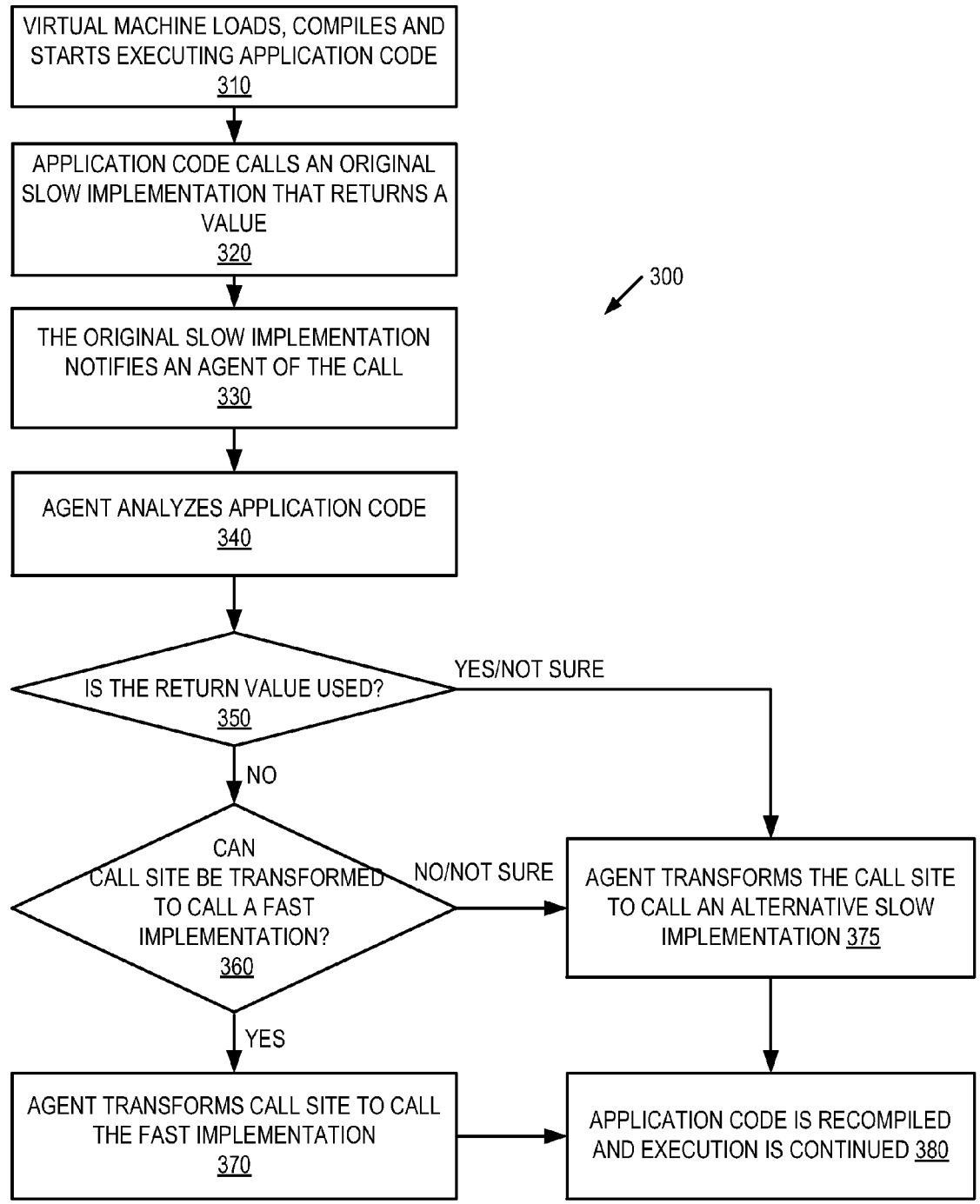
FIG. 3 is a flow diagram illustrating one embodiment of a method of optimizing application code during runtime.

FIG. 3 is a flow diagram illustrating one embodiment of a method 300 of optimizing application code (e.g., the application code 130 of FIG. 1), which calls an implementation of an operation that returns a value. The method 300 may be performed by a computer system 500 of FIG. 5 that may comprise hardware (e.g., circuitry, dedicated logic, programmable logic, microcode, or other similar hardware logic), software (e.g., instructions run on a processing device), or a combination thereof. In one embodiment, the method 300 is performed by the computer system 100 of FIG. 1.

Referring to FIGS. 2 and 3, in one embodiment, the method 300 begins when the virtual machine 120 loads the application code 130 (in bytecode), compiles the application code, and executes the compiled application code (block 310). During runtime (i.e., when the application code 130 is being executed), the application code 130 calls the original slow implementation 230 that returns a value (block 320). The implementer 150 (more specifically, the original slow implementation 230) notifies the agent 140 of the call (block 330). Upon notification, the agent 140 analyzes the application code 130 (block 340). The agent 140 determines whether the return value is used (e.g., consumed or stored) by the application code 130 (block 350). If the return value is not used, the agent 140 further determines whether the application code 130 (more specifically, the call site) can be transformed to call the fast implementation 250 (block 360). If the call site can be transformed to call the fast implementation 250, the agent 140 transforms the call site to call the fast implementation 250 (block 370). The agent 140 transforms the application code 130 to call the alternative slow implementation 240 (block 375) in other scenarios, e.g., if the return value is used, if it cannot be determined whether the return value is used, if the call site cannot be transformed to call the fast implementation 250, or if it cannot be determined whether the call site can be transformed to call the fast implementation 250. After the transformation, the application code 130 is recompiled and continues to be executed on the virtual machine 120 (block 380).

Figure 4:
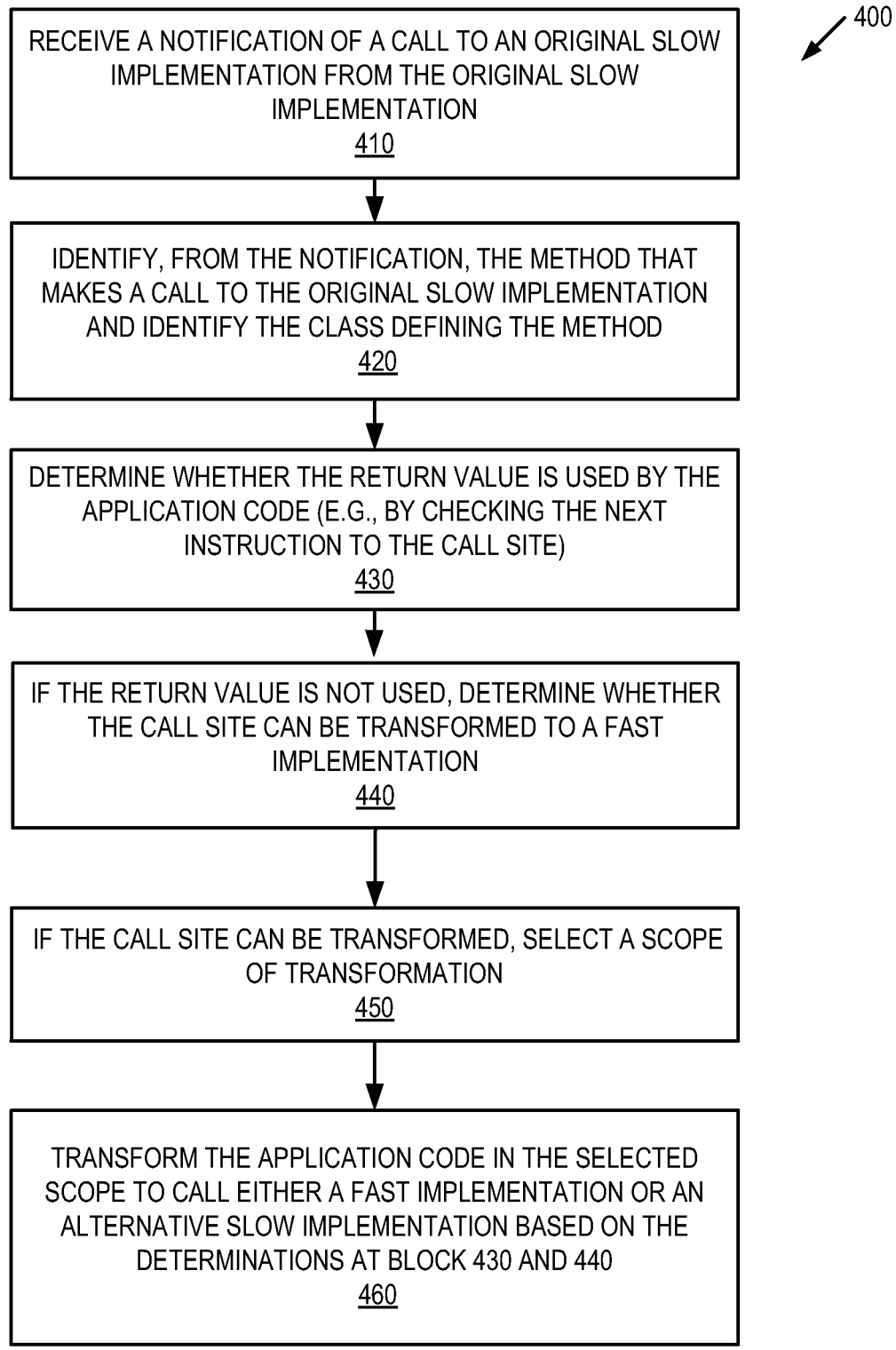
FIG. 4 is a flow diagram illustrating one embodiment of a method performed by the agent of FIG. 2 for optimizing application code during runtime.

FIG. 4 is a flow diagram illustrating one embodiment of a method 400 of an agent (e.g., the agent 140 of FIG. 1) performing optimization of application code 130, which calls implementation of an operation that returns a value. The method 400 may be performed by a computer system 500 of FIG. 5 that may comprise hardware (e.g., circuitry, dedicated logic, programmable logic, microcode, or other similar hardware logic), software (e.g., instructions run on a processing device), or a combination thereof. In one embodiment, the method 400 is performed by the computer system 100 of FIG. 1.

Referring to FIGS. 2 and 4, in one embodiment, the method 400 begins when the agent 140 receives a notification of a call to the original slow implementation 230 from the implementer 150 (more specifically, the original slow implementation 230) (block 410). From the notification, the agent 140 identifies the method from which a call to the original slow implementation 230 is made and identifies the class that defines the method (block 420). The agent 140 then determines whether the return value from the original slow implementation 230 is used by the application code 130; e.g., by checking the instruction next to the call site (block 430). If the return value is not used, the agent 140 also determines whether the call site can be transformed to the fast implementation 250 (block 440). If the call site can be transformed to the fast implementation 250, in some embodiments, the agent 140 can select a scope of transformation (block 450); e.g., the method identified from the notification, all methods in the class defining the method, a single call within the method (e.g., the call site), or a subset of calls within the method. Based on the determinations at blocks 430 and 450, the agent 140 transforms the application code 130 in the selected scope to call either the fast implementation 250 (if the return value is not used and the call site can be transformed to call the fast implementation 250), or the alternative slow implementation 240 (in other cases) (block 460).

Figure 5:
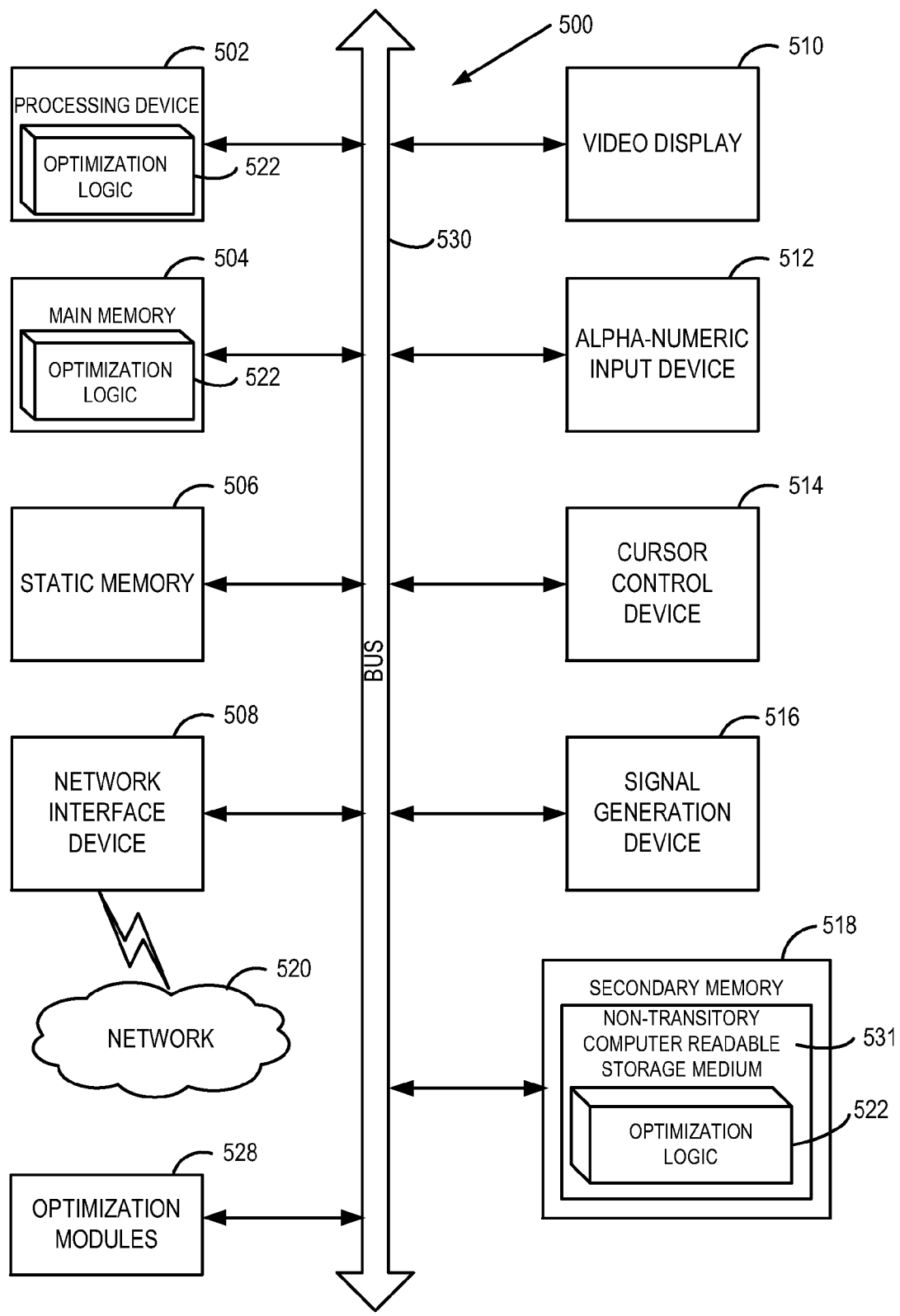
FIG. 5 illustrates a diagrammatic representation of an embodiment of a computer system.

FIG. 5 illustrates a diagrammatic representation of a machine in the exemplary form of a computer system 500 within which a set of instructions, for causing the machine to perform any one or more of the methodologies discussed herein, may be executed. In alternative embodiments, the machine may be connected (e.g., networked) to other machines in a Local Area Network (LAN), an intranet, an extranet, or the Internet. The machine may operate in the capacity of a server or a client machine in a client-server network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a server, a network router, switch or bridge, or any machine capable of executing a set of instructions (sequential or otherwise) that specify actions to be taken by that machine. Further, while only a single machine is illustrated, the term "machine" shall also be taken to include any collection of machines (e.g., computers) that individually or jointly execute a set (or multiple sets) of instructions to perform any one or more of the methodologies discussed herein.

The exemplary computer system 500 includes a processing device 502, a main memory 504 (e.g., read-only memory (ROM), flash memory, dynamic random access memory (DRAM) such as synchronous DRAM (SDRAM), Rambus DRAM (RDRAM), or other variations of memory devices), a static memory 506 (e.g., flash memory, static random access memory (SRAM), or other variations of static memory), and a secondary memory 518 (e.g., a data storage device), which communicate with each other via a bus 530.

The processing device 502 represents one or more general-purpose processing devices such as a microprocessor, central processing unit, or the like. More particularly, the processing device 502 may be a complex instruction set computing (CISC) microprocessor, reduced instruction set computing (RISC) microprocessor, very long instruction word (VLIW) microprocessor, processor implementing other instruction sets, or processors implementing a combination of instruction sets. The processing device 502 may also be one or more special-purpose processing devices such as an application specific integrated circuit (ASIC), a field programmable gate array (FPGA), a digital signal processor (DSP), network processor, or the like. The processing device 502 is configured to execute optimization logic 522 for performing the operations and steps discussed herein.

The computer system 500 may further include a network interface device 508. The computer system 500 also may include a video display unit 510 (e.g., a liquid crystal display (LCD) or a cathode ray tube (CRT)), an alphanumeric input device 512 (e.g., a keyboard), a cursor control device 514 (e.g., a mouse), and a signal generation device 516 (e.g., a speaker).

The secondary memory 518 may include a machine-readable storage medium (or more specifically a non-transitory computer readable storage medium 531) on which is stored one or more sets of instructions (e.g., the optimization logic 522) embodying any one or more of the methodologies or functions described herein (e.g., the agent 140 and the implementer 150 of FIG. 1 and FIG. 2). The optimization logic 522 may also reside, completely or at least partially, within the main memory 504 and/or within the processing device 502 during execution thereof by the computer system 500; the main memory 504 and the processing device 502 also constituting machine-readable storage media. The optimization logic 522 may further be transmitted or received over a network 520 via the network interface device 508.

The non-transitory computer readable storage medium 531 may also be used to store the optimization logic 522 persistently. While the non-transitory computer readable storage medium 531 is shown in an exemplary embodiment to be a single medium, the term "non-transitory computer readable storage medium" should be taken to include a single medium or multiple media (e.g., a centralized or distributed database, and/or associated caches and servers) that store the one or more sets of instructions. The term "non-transitory computer readable storage medium" shall also be taken to include any medium that is capable of storing or encoding a set of instructions for execution by the machine that causes the machine to perform any one or more of the methodologies of the present invention. The term "non-transitory computer readable storage medium" shall accordingly be taken to include, but not be limited to, solid-state memories, and optical and magnetic media.

The computer system 500 may additionally include optimization modules 528 for implementing the functionalities of the agent 140 and the implementer 150 of FIG. 1 and FIG. 2. The module 528, components and other features described herein (for example in relation to FIG. 1 and FIG. 2) can be implemented as discrete hardware components or integrated in the functionality of hardware components such as ASICS, FPGAs, DSPs or similar devices. In addition, the module 528 can be implemented as firmware or functional circuitry within hardware devices. Further, the module 528 can be implemented in any combination of hardware devices and software components.

Some portions of the detailed descriptions which follow are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise, as apparent from the following discussion, it is appreciated that throughout the description, discussions utilizing terms such as "loading," "executing," "receiving," "performing," "optimizing," or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Embodiments of the present invention also relate to an apparatus for performing the operations herein. This apparatus may be specially constructed for the required purposes, or it may comprise a general purpose computer system selectively programmed by a computer program stored in the computer system. Such a computer program may be stored in a computer readable storage medium, such as, but not limited to, any type of disk including optical disks, CD-ROMs, and magnetic-optical disks, read-only memories (ROMs), random access memories (RAMs), EPROMs, EEPROMs, magnetic disk storage media, optical storage media, flash memory devices, other type of machine-accessible storage media, or any type of media suitable for storing electronic instructions, each coupled to a computer system bus.

The algorithms and displays presented herein are not inherently related to any particular computer or other apparatus. Various general purpose systems may be used with programs in accordance with the teachings herein, or it may prove convenient to construct a more specialized apparatus to perform the required method steps. The required structure for a variety of these systems will appear as set forth in the description below. In addition, the present invention is not described with reference to any particular programming language. It will be appreciated that a variety of programming languages may be used to implement the teachings of the invention as described herein.

It is to be understood that the above description is intended to be illustrative, and not restrictive. Many other embodiments will be apparent to those of skill in the art upon reading and understanding the above description. Although the present invention has been described with reference to specific exemplary embodiments, it will be recognized that the invention is not limited to the embodiments described, but can be practiced with modification and alteration within the spirit and scope of the appended claims. Accordingly, the specification and drawings are to be regarded in an illustrative sense rather than a restrictive sense. The scope of the invention should, therefore, be determined with reference to the appended claims, along with the full scope of equivalents to which such claims are entitled.

What is claimed is:

1. A method comprising:
loading, by a processing device, application code that has been intermediately compiled into bytecode;
executing the application code by the processing device after compiling the application code with the processing device, wherein during runtime the application code makes a call from a call site to an implementation of an operation, which returns a value to the application code and transmits a notification to an agent;
receiving the notification of the call by the agent during the runtime of the application code, the agent operating independently of all compilers;
in response to receiving the notification, performing an analysis on the application code by the agent during runtime of the application code to determine whether the value is used by the application code; and
optimizing, by the processing device, the application code by the agent, wherein the optimizing comprises transforming the call site in view of a result of the analysis to call an alternative implementation, which returns a value without transmitting the notification to the agent, wherein the transforming is performed in response to a determination that the value is used by the application code.

2. The method of claim 1, wherein optimizing the application code further comprises:
transforming an additional call site to call a fast implementation of the operation that does not return any value, wherein the transforming is performed in response to a determination that the value is not used by the application code.

3. The method of claim 1, wherein optimizing the application code further comprises:
transforming an additional call site to call an alternative slow implementation of the operation that returns the value and does not notify the agent when it cannot be determined whether the additional call site can be transformed into a fast implementation of the operation that does not return any value.

4. The method of claim 1, wherein performing an analysis on the application code further comprises:
checking a next instruction to the call site in the application code; and
determining that the value is not used when the next instruction is a pop or a return.

5. The method of claim 1, wherein performing an analysis of the application code further comprises:
determining whether the value is consumed by the application code or stored by the application code.

6. The method of claim 1, wherein performing an analysis of the application code further comprises:
identifying, from the notification, a method from which the call is made;
identifying a class that defines the method; and
selecting a scope of the application code to be transformed from one of the following: the method, all methods in the class, a single call within the method, or a subset of calls within the method.

7. The method of claim 1, wherein the implementation of an operation is provided by an implementer that is part of a library in the processing device and the library receives no hints of calls that are to be made by the application code before execution of the application code.

8. A system comprising:
a memory to store application code that has been intermediately compiled into bytecode; and
a processing device operatively coupled to the memory, the processing device to load the application code into the memory, compile the application code, execute the application code, wherein during runtime the application code makes a call from a call site to an implementation of an operation that returns a value to the application code and transmits a notification to an agent,
wherein the processing device is further to run an implementer of the implementation and the agent that operates independently of all compilers, the agent is to receive the notification of the call during the runtime of the application code and in response to receiving the notification, perform an analysis on the application code during runtime of the application code to determine whether the value is used by the application code, and optimize the application code with a transformation to the call site in view of a result of the analysis to call an alternative implementation, which returns a value without transmitting the notification to the agent, wherein the transforming is performed in response to a determination that the value is used by the application code.

9. The system of claim 8, wherein the agent is further to transform the call site to call a fast implementation of the operation that does not return any value in response to a determination that the value is not used by the application code.

10. The system of claim 8, wherein the agent is further to transform the call site to call an alternative slow implementation of the operation that returns the value in response to a determination that the value is used by the application code or when it cannot be determined whether the call site can be transformed into a fast implementation of the operation that does not return any value.

11. The system of claim 8, wherein the implementer is part of a library in the processing device and the library receives no hints of calls that are to be made by the application code before execution of the application code.

12. The system of claim 8, wherein the application code is executed by a virtual machine hosted on the processing device.

13. A non-transitory computer readable storage medium comprising instructions that, when executed by a processing device, cause the processing device to:
load, by the processing device, application code that has been intermediately compiled into bytecode;
execute the application code by the processing device after compiling the application code with the processing device, wherein during runtime the application code makes a call from a call site to an implementation of an operation, which returns a value to the application code and transmit a notification to an agent;
receive the notification of the call by the agent during the runtime of the application code, the agent operating independently of all compilers;
in response to receiving the notification, perform an analysis on the application code by the agent during runtime of the application code to determine whether the value is used by the application code; and
optimize, by the processing device, the application code by the agent, wherein the optimization comprises transforming the call site in view of a result of the analysis to call an alternative implementation, which returns a value without transmitting the notification to the agent, wherein the transforming is performed in response to a determination that the value is used by the application code.

14. The non-transitory computer readable storage medium of claim 13, wherein optimize the application code further comprises:
   transform the call site to call a fast implementation of the operation that does not return any value, wherein the transform is performed in response to a determination that the value is not used by the application code.

15. The non-transitory computer readable storage medium of claim 13, wherein optimize the application code further comprises:
   transform the call site to call an alternative slow implementation of the operation that returns the value and does not notify the agent, wherein the transform is performed in response to a determination that the value is used by the application code.

16. The non-transitory computer readable storage medium of claim 13, wherein optimize the application code further comprises:
   transform the call site to call an alternative slow implementation of the operation that returns the value and does not notify the agent when it cannot be determined whether the call site can be transformed into a fast implementation of the operation that does not return any value.

17. The non-transitory computer readable storage medium of claim 13, wherein perform an analysis of the application code further comprises:
   check a next instruction to the call site in the application code; and
   determine that the value is not used when the next instruction is a pop or a return.

18. The non-transitory computer readable storage medium of claim 14, wherein perform an analysis of the application code further comprises:
   determine whether the value is consumed by the application code or stored by the application code.

19. The non-transitory computer readable storage medium of claim 13, wherein perform an analysis of the application code further comprises:
   identify, from the notification, a method from which the call is made;
   identify a class that defines the method; and
   select a scope of the application code to be transformed from one of the following: the method, all methods in the class, a single call within the method, or a subset of calls within the method.

* * * * *